US011902823B1

(12) United States Patent
Costa et al.

(10) Patent No.: US 11,902,823 B1
(45) Date of Patent: Feb. 13, 2024

(54) METHODS AND SYSTEMS TO SUPPORT WIRELESS LOCAL AREA NETWORK (WLAN) QUALITY OF SERVICE (QOS)

(71) Applicant: T-Mobile Innovations LLC, Overland Park, KS (US)

(72) Inventors: Julio C. Costa, Tampa, FL (US); Sameer Akbar Khan, Overland Park, KS (US); Muralidhar Malreddy, Overland Park, KS (US); Bhanu Prakash Voruganti, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 253 days.

(21) Appl. No.: 17/475,247

(22) Filed: Sep. 14, 2021

(51) Int. Cl.
*H04W 28/02* (2009.01)
*H04W 12/06* (2021.01)
*H04W 4/24* (2018.01)
*H04W 84/12* (2009.01)

(52) U.S. Cl.
CPC ......... *H04W 28/0268* (2013.01); *H04W 4/24* (2013.01); *H04W 12/06* (2013.01); *H04W 84/12* (2013.01)

(58) Field of Classification Search
CPC . H04W 28/00; H04W 28/02; H04W 28/0268; H04W 4/24; H04W 4/30; H04W 4/50; H04W 12/06; H04W 84/02; H04W 84/12
See application file for complete search history.

(56) References Cited

U.S. PATENT DOCUMENTS

| | | | |
|---|---|---|---|
| 9,843,687 B2 * | 12/2017 | Campbell | H04W 48/18 |
| 2012/0158872 A1 * | 6/2012 | McNamee | H04L 69/40 709/206 |
| 2014/0040975 A1 * | 2/2014 | Raleigh | H04L 12/1435 726/1 |
| 2014/0162676 A1 * | 6/2014 | Shaw | H04W 76/00 455/452.2 |
| 2014/0331296 A1 * | 11/2014 | Faccin | H04W 48/20 726/6 |
| 2015/0105049 A1 * | 4/2015 | Golaup | H04W 12/06 455/411 |
| 2015/0327052 A1 * | 11/2015 | Ghai | H04W 48/02 370/328 |

(Continued)

FOREIGN PATENT DOCUMENTS

CA 3001889 C * 8/2023 .......... H04B 1/3816

*Primary Examiner* — Kevin D Mew

(57) ABSTRACT

A wireless communications system comprises wireless local area network (WLAN), WLAN controller coupled to the WLAN, a core network, a RADIUS based interface, and an interface between the WLAN controller and the PCRF. The WLAN controller is configured to transmit, via the RADIUS based interface, to the AAA, a request to authenticate a user equipment (UE) currently accessing the core network, wherein the first message comprises an identifier identifying the UE. The PCRF is configured to transmit, via the interface between the WLAN controller and the PCRF, a policy associated with the UE, wherein the policy indicates a quality of service (QoS) subscribed for by a user of the UE in the core network. The WLAN controller is further configured to manage resources within the WLAN, based on the policy, to establish a session between the UE and the WLAN.

20 Claims, 8 Drawing Sheets

(56) References Cited

U.S. PATENT DOCUMENTS

| | | | | |
|---|---|---|---|---|
| 2016/0088676 A1* | 3/2016 | Zhao | ................. | H04W 12/08 |
| | | | | 370/328 |
| 2017/0289883 A1* | 10/2017 | Kiss | ................. | H04W 12/03 |
| 2019/0007236 A1* | 1/2019 | Ishii | ................. | H04L 12/4633 |

\* cited by examiner

METHODS AND SYSTEMS TO SUPPORT WIRELESS LOCAL AREA NETWORK (WLAN) QUALITY OF SERVICE (QOS)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carrier operated networks have grown substantially in subscriber base as end users become increasingly connected to mobile wireless environments. As the number of mobile subscribers increases, traffic within the carrier networks increases at a rate faster than carrier operators can add capacity within the network. In some cases, users may access different wireless networks simultaneously to decrease the load in the carrier networks. However, users may not experience the same quality of service (QoS) while accessing the different wireless networks. Therefore, there are significant challenges in managing access to wireless networks.

SUMMARY

In an embodiment, a method to provide quality of service (QoS) treatment for a user equipment (UE) is disclosed. The method is performed by a wireless local area network (WLAN) controller for using an interface between the WLAN controller and a Policy Charging and Rules Function (PCRF) in a core network. The method comprises transmitting, by the WLAN controller to an Authentication, Authorization and Accounting (AAA) in the core network via a RADIUS based interface, a first request to authenticate the UE currently accessing the core network, wherein the first request comprises an identifier identifying the UE, receiving, by the WLAN controller from the AAA via the RADIUS based interface, an authentication result indicating that the UE is authorized to access the WLAN in response to transmitting the first request to the AAA, transmitting, by the WLAN controller to the PCRF via the interface between the WLAN controller and the PCRF, a second request for a policy associated with the UE, wherein the policy indicates a QoS subscribed for by a user of the UE in the core network, receiving, by the WLAN controller from the PCRF via the interface between the WLAN controller and the PCRF, the policy associated with the UE, and managing, by the WLAN controller, resources within the WLAN, based on the policy, to establish a session between the UE and the WLAN.

In another embodiment, a WLAN controller for providing a QoS treatment for a UE in a WLAN is disclosed. The WLAN controller comprises a non-transitory memory configured to store instructions, and a processor coupled to memory and configured to execute the instructions. When the instructions are executed by the processor, the processor is configured to transmit, to an AAA in a core network via a RADIUS based interface, a first request to authenticate the UE currently accessing the core network, wherein the first request comprises an identifier identifying the UE, receive, from the AAA via the RADIUS based interface, an authentication result indicating that the UE is authorized to access the WLAN in response to transmitting the first request to the AAA, transmit, to a PCRF in the core network via an interface between the WLAN controller and the PCRF, a second request for a policy associated with the UE, wherein the policy indicates a QoS subscribed for by a user of the UE in the core network, receive, from the PCRF via the interface between the WLAN controller and the PCRF, the policy associated with the UE, and manage resources within the WLAN, based on the policy, to establish a session between the UE and the WLAN.

In yet another embodiment, a wireless communications system is disclosed. The wireless communications system comprises a WLAN, a WLAN controller coupled to the WLAN, a core network, a RADIUS based interface, and an interface between the WLAN controller and a PCRF. The core network comprises an AAA and the PCRF. The WLAN controller is configured to transmit, via the RADIUS based interface, to the AAA, a request to authenticate a UE currently accessing the core network, wherein the first message comprises an identifier identifying the UE. The PCRF is configured to transmit, via the interface between the WLAN controller and the PCRF, a policy associated with the UE, wherein the policy indicates a QoS subscribed for by a user of the UE in the core network. The WLAN controller is configured to manage resources within the WLAN, based on the policy, to establish a session between the UE and the WLAN.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
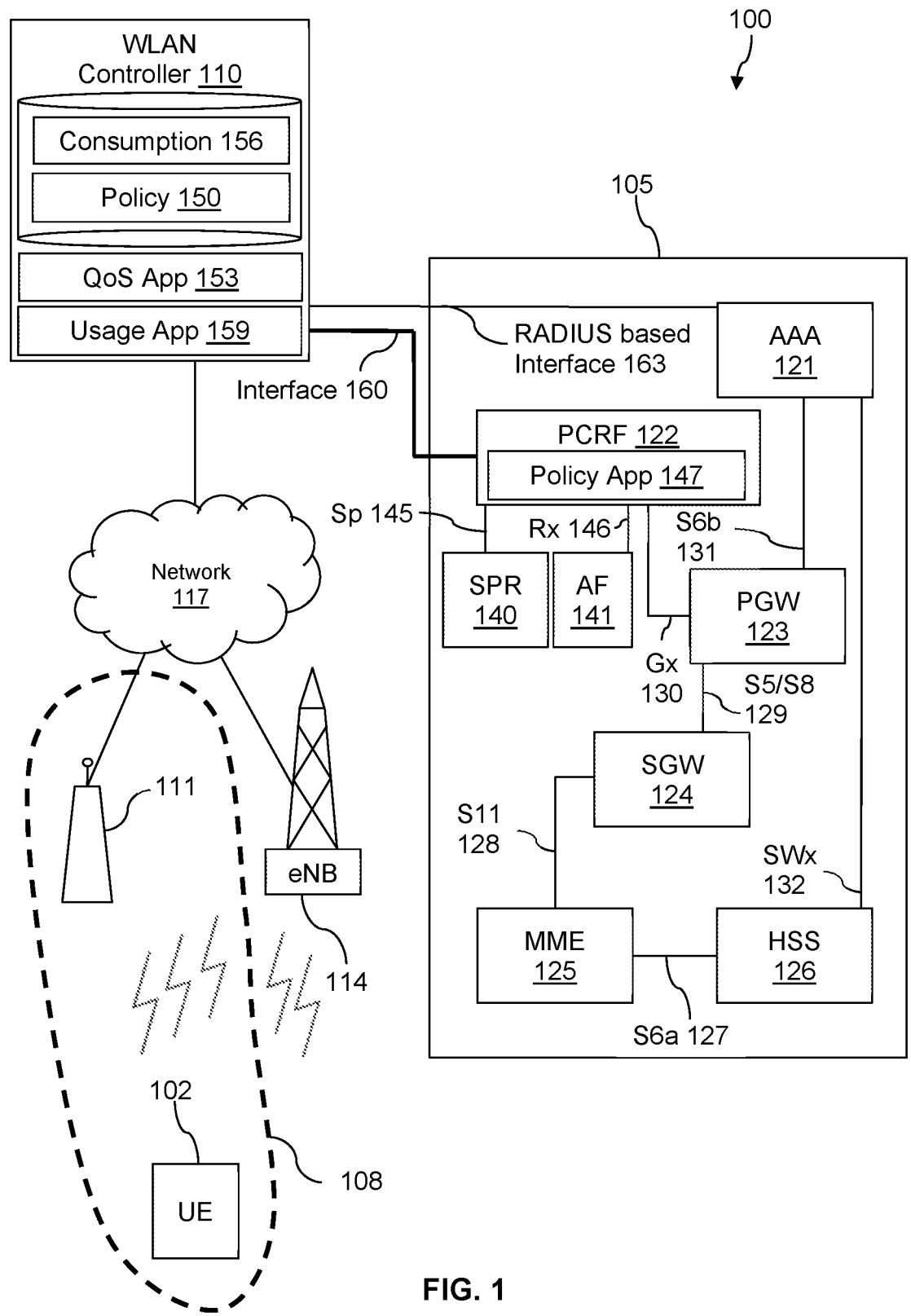
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In some circumstances, traffic may need to be offloaded from a core network to a wireless local area network (WLAN), such as a Wireless Fidelity (WiFi) network. For example, the core network may be operated by a telecommunications carrier, such as T-MOBILE, while the WLAN is operated locally using a WLAN controller. The WLAN controller manages the resources to offload traffic of one or more devices from the core network to the WLAN, such that the devices are enabled to use the resources within the WLAN. In this way, the WLAN controller allocates the resources for the different devices within the WLAN without differentiating a quality of service (QoS) for the different devices. That is, the WLAN controller does not consider whether a particular device requires a higher quality of service (QoS) than other devices. In addition, carrier operators do not track subscriber usage of WLAN access since the carrier networks cannot guarantee a QoS for these subscribers within the WLAN. It would be desirable from many perspectives to be able to provide a differentiated QoS for the different devices in the WLAN while providing carriers the opportunity to track and audit subscribers for utilizing resources within the WLAN.

The present disclosure is directed to methods, apparatuses, and systems for providing the differentiated QoS for the different devices in the WLAN using user credentials that are pre-registered with the carrier. In an embodiment, a new interface is provided between the WLAN controller and a Policy and Charging Rules Function (PCRF) within an evolved packet core (EPC) of the core network, in which the EPC may be owned and operated by a carrier. The embodiments disclosed herein provide for an enhanced WLAN controller and an enhanced PCRF, both of which may be configured to support the new interface and communicate through the interface in a manner that is compatible with one another.

In an embodiment, when a device is attempting to access the WLAN, the WLAN controller may first communicate with an Authentication, Authorization and Accounting (AAA) in the EPC to authenticate the device using carrier credentials. The AAA may authenticate the device based on subscriber information that has been pre-registered with the carrier, such as an identifier of the device. Once the WLAN is notified that the device is authenticated, the WLAN controller may request a policy for the device from the PCRF via the new interface. The PCRF may then obtain the policy based on a subscription associated with the device, which has been previously registered with the carrier.

In an embodiment, the policy specifies a QoS subscribed for by the user of the device (e.g., subscriber). The PCRF may forward the policy to the WLAN controller via the new interface after formatting the policy into a language that is compatible with the new interface and the WLAN controller. In one embodiment, the WLAN controller may be optimized to manage the resources within the WLAN based on the QoS parameters described by the policies received from the PCRF, as opposed to evenly distributing WLAN resources among the devices. In another embodiment, one or more components, separate from the WLAN controller, may manage the resources within the WLAN to enforce the QoS parameters for the device.

In an embodiment, the WLAN controller, the EPC, and the WLAN may all be owned and operated by the same entity. In this case, the user behind the device may not need to manually enter the service set identifier (SSID) and password of the WLAN into the device. Instead, the system may authenticate the device using the subscriber information registered with the carrier, and then automatically offload traffic of the device between the WLAN and core network as needed, seamlessly. In this case, the offloading of subscriber traffic between the different wireless networks may be completely transparent to the subscriber, further enhancing the user experience as a subscriber with the carrier.

In addition, the embodiments of the present disclosure are advantageous in that the embodiments disclosed herein enable the WLAN controller to efficiently and effectively manage resources within the WLAN. This in turn enables the WLAN to conserve resources within both the WLAN and the core network. For example, instead of providing all the devices in the WLAN a particular bitrate, the WLAN controller may provide the devices a bitrate based on a subscribed for bit rate indicated by the policy of the subscriber. By providing different bit rates for different subscribers, the WLAN controller can better manage the available resources within the network, to ensure that more important personnel or premium subscribers are able to utilize the higher bitrates. In this way, differentiating QoS among subscriber devices in a WLAN enables a more efficient use of the resources (e.g., bandwidth, latency, bitrate, memory, processing power, etc.) within the WLAN. The embodiments disclosed herein thus prevent the resources in a network from being overloaded unnecessarily, while enabling carriers to potentially track and audit a QoS provided to subscribers per WLAN usage to balance resources in the network. The embodiments disclosed herein may also enable WLAN operators to provide higher value service to certain customers, more efficiently generate invoices for customers, and determine additional WLANs in an area based on customer usage.

Turning now to FIG. 1, a communication system 100 is described. The system 100 comprises a user equipment (UE) 102, a core network 105, a wireless local area network (WLAN) 108, a WLAN controller 110, a wireless access point 111, a cell site 114, and a network 117. The UE 102 may be communicatively coupled to the core network 105, network 117, and/or the WLAN controller 110 via the cell site 114. Similarly, the UE 102 may be communicatively coupled to the WLAN 108, network 117, and/or the WLAN controller 110 via the wireless access point 111.

UE 102 may be a cell phone, a mobile phone, a smart phone, a personal digital assistant (PDA), an Internet of things (IoT) device, a wearable computer, a headset computer, a laptop computer, a tablet computer, or a notebook computer. The network 117 may be one or more private networks, one or more public networks, or a combination thereof. The cell site 114 provides the UE 102 a wireless communication link to the WLAN controller 110 and/or the core network 105 according to a 5G, a long term evolution (LTE), a code division multiple access (CDMA), or a global system for mobile communications (GSM) wireless telecommunication protocol. The wireless access point 111 provides the UE 102 wireless communication link to the WLAN controller 110 and/or the WLAN 108 according to a wireless protocol. The user operating the UE 102 and previously subscribed with the carrier of the core network 105 is referred to herein as the "subscriber."

WLAN 108 may also be one or more private networks, one or more public networks, or a combination thereof. In an embodiment, the WLAN 108 may be a wireless network implemented according to the wireless protocol, such as Wireless Fidelity "WiFi", available to a plurality of different UEs 102 via the wireless access point 111. The WLAN 108 may include the wireless access point 111 and one or more UEs 102.

In an embodiment, the WLAN 108 includes the WLAN controller 110, such that the WLAN 108 and the WLAN controller 110 are operated by the same entity. In another embodiment, the core network 105 includes the WLAN controller 110, such that the WLAN controller 110 and the core network 105 are owned and operated by the same carrier. In yet another embodiment, the WLAN controller 110 may be separate from both the WLAN 108 and the core network 105, such that the WLAN controller 110, WLAN 108, and the core network 105 are each owned and operated by different entities.

In an embodiment, the core network 105 is an EPC, which may be coupled to one or more radio access networks (RANs) and operated by a telecommunications carrier, such as T-MOBILE. Pre-paid customers may be subscribed to use the core network 105 using the UE 102. The core network 105 may be a configured to implement a 5G, a LTE, a CDMA, or a GSM wireless telecommunication protocol. In one embodiment, the core network 105 may be a 3rd Generation Partnership Project (3GPP) Evolved Packet System (EPS).

As shown in FIG. 1, the core network 105 generally includes an Authentication, Authorization and Accounting (AAA) 121, a PCRF 122, a packet data network (PDN) gateway (PGW) 123, a serving gateway (SGW) 124, a Mobility Management Entity (MME) 125, a Home Subscriber Server (HSS) 126, the Subscription Profile Repository (SPR) 140, and the Application Function (AF) 141. The MME 125 is communicatively coupled to the HSS 126 via the S6a interface 127. The MME 125 is communicatively coupled to SGW 124 via the S11 interface 128. The SGW 124 is communicatively coupled to the PGW 123 via the S5 or S8 interface 129. The PGW 123 is communicatively coupled to the PCRF 122 via the Gx interface 130. The PGW 123 is also communicatively coupled to the AAA 121 via the S6b interface 131. The AAA 121 is communicatively coupled to the HSS 126 via the SWx interface 132. The PCRF 122 is communicatively coupled to the SPR 140 via the Sp interface 145 and communicatively coupled to the AF 141 via the Rx interface 146. These components and interfaces within the core network 105 may be used to provide various services and/or functions to implement QoS on packet flows for the UE 102 when the UE 102 is connected to the core network 105.

As described above, the core network 105 includes a series of interfaces that offer mobility, policy control, AAA functions, and/or charging activities for the various elements in the core network 105. The S6a interface 127 may be an interface enabling the transfer of subscription and authentication data for authenticating/authorizing user access to the core network 105. The S11 interface 128 may be an interface supporting mobility and bearer management between the MME 125 and the SGW 124. The S5 or S8 interface 129 may be an interface providing support for packet data services toward end users during roaming and non-roaming cases. The Gx interface 130 may be an interface enabling the transmission of policies and charging rules from the PCRF 122 to the PGW 123. The S6b interface 131 may be an interface enabling the transmission of mobility related authentication and authorization information. The SWx 132 may be an interface enabling the transmission of authentication data between the AAA 121 and the HSS 126. The Sp interface 145 may be an interface enabling the transmission of subscription information of users subscribed to the carrier between the SPR 140 and the PCRF 122. The Rx interface 146 may be an interface enabling the transmission of application information between the AF 141 and the PCRF 122.

As should be appreciated, the core network 105 includes other components and interfaces that are not otherwise shown and described in FIG. 1. Moreover, it should be appreciated that the components within the core network 105 (e.g., the AAA 121, PCRF 122, PGW 123, SGW 124, MME 125, and HSS 126) may each be implemented as a separate hardware node (e.g., a server comprising processor and memory resources) or as a software module within a larger server comprising processor and memory resources. In an embodiment, the components within the core network 105 may also be part of the network 117, but are illustrated separately in FIG. 1 to further clarify the present disclosure. In some embodiments, the interfaces described above may be wireless or wired links, or Application Programming Interfaces (APIs), configured to communicatively couple one or more of the components within the core network 105.

Referring now to the functioning of the components within the core network 105, the MME 125 may be the primary control element for the EPC within the core network 105. Among other things, the MME 125 provides for UE tracking and paging procedures including, for example, retransmissions, tracking area list management, idle mode UE tracking, etc. For example, the MME 125 may maintain tracking information for the UE 102 regarding previous and current information for UE transitions between or within other RANs.

The HSS 126 is a central database that contains subscriber related information of users subscribed with the carrier operating the core network 105. The HSS 126 performs mobility management, call and session establishment support, user authentication, and access authorization. In an embodiment, the HSS 126 may store identification information identifying various UEs 102 associated with or belonging to a subscriber. The identification information may include an International Mobile Subscriber Identity (IMSI) information of the UE 102, or any other identifier identifying the UE 102 associated with the subscriber. The HSS 126 may also store a subscription package of the subscriber, in which, for example, the subscription package may indicate a particular QoS that the subscriber is paying for as a customer of the carrier.

The SGW 124 is a data plane element that may route and forward user data packets within the core network 105, while acting as a mobility anchor for the user plane during handovers. The SGW 124 manages user mobility and interfaces with one or more access networks, and maintains data paths between eNodeBs in the cell site 114 and the PGW 123. The PGW 123 may provide Internet Protocol (IP) connectivity access network session connectivity for UEs 102 to external packet data networks (PDNs), such as, for example, the Internet.

The AAA 121 provides access, control, and security for the core network 105 by supporting a set of protocols that mediate and track user access by authenticating, authorizing, and accounting for UE 102 activities. In particular, AAA 121 may communicate with the HSS 126 to receive subscription information to perform authentication between the UE 102 and the core network 105. The AAA 121 may use the SWx interface 132 using the diameter base protocol to retrieve information used to authenticate the UE 102 from the HSS 126. For example, the authentication may be performed using wireless extensible authorization protocol (EAP) subscriber identity module (EAP-SIM) authentication techniques and/or EAP-authentication and key agreement (EAP-AKA) authentication techniques.

The PCRF 122 may determine and manage policies for a subscriber to provide a particular QoS for the UE 102 of the subscriber based on the subscription with the carrier operating the core network 105. The PCRF 122 supports service data flow detection, policy enforcement, and flow-based charging by interfacing with the PGW 123 using the Gx interface 130. The PCRF 122 may execute a policy application 147 to generate one or more policies 150 for the UE 102 based on subscriber information received from the SPR 140 and/or application information received from the AF 141. In an embodiment, the PCRF 122 may be provided by one or more applications executing on a computing device.

The SPR 140 is a logical database which contains subscription information related to policy and charging control, and the SPR 140 may transmit relevant subscriber information to the PCRF 122 as needed for the PCRF 122 to determine policies 150. For example, the SPR 140 may store identification information for one or more UEs 102 associated with a subscriber, and an expected QoS associated with the subscriber. The subscription information may include at least one of allowed services, allowed QoS, charging related information, or a category. The AF 141 may transmit descriptions of applications/services to the PCRF 122 that may require dynamic policy and/or charging control for one or more UEs 102.

The policies 150 may be, for example, a policy and charging control (PCC) rule governing the priority assigned to certain traffic and how available bandwidth is divided for devices associated with different subscribers. For example, the policies 150 may include a QoS policy, a bandwidth control policy, a subscriber aware policy, a gating policy, or any other rule governing the management of network resources for a UE 102 and/or the network.

A QoS policy may refer to a policy defining a particular QoS for which a subscriber has pre-registered. For example, the QoS policy may refer to a minimum data rate or latency for which a subscriber expects from the carrier based on a prepaid subscription. The QoS policy may refer to any QoS parameter that may relate to the performance of a communications channel or system. For example, other QoS parameters may include SNR (Signal to Noise Ratio), BER (Bit Error Ratio), maximum and mean throughput rate, reliability, priority and other factors specific to each service/subscriber.

A bandwidth control policy may refer to a policy defining the management of bandwidth within various communication channels of a network. For example, a bandwidth control policy may indicate that certain services and/or subscribers are guaranteed a certain proportion of the bandwidth available in the network. A subscriber aware policy may refer to a policy defining certain types of subscribers as being given a higher priority for utilizing the available bandwidth in the network. For example, subscribers registered as first responders, medical personnel, or other emergency service personnel, may be given the highest priority for access to available bandwidth and high QoS in the network. A gating policy may refer to a policy defining whether a certain subscriber is permitted to access a network or whether a certain service or application is permitted to access a network.

In an embodiment, the WLAN controller 110 may authenticate a UE 102 and manage the resources in the WLAN 108 to provide the UE 102 access to the WLAN 108 using the policies 150 determined by the PCRF 122. The WLAN controller 110 may communicate with the AAA 121 using a Remote Authentication Dial-In User Service (RADIUS) based interface 163 to authenticate the UE 102, and the WLAN controller 110 may communicate with the PCRF 122 using an interface 160 to retrieve the policies 150 from the PCRF 122. In an embodiment, the PCRF 122 may be provided by one or more applications executing on a computing device.

The RADIUS based interface 163 may be a Sta interface over which RADIUS based messages (e.g., messages formatted according to the RADIUS protocol) are transmitted between the WLAN controller 110 and the AAA 121. The messages forwarded over the RADIUS based interface 163 may implement the EAP-AKA authentication procedures between the UE 102 and the core network 105.

In an embodiment, the interface 160 may be configured as one or more APIs enabling communication between the WLAN controller 110 and the PCRF 122. For example, the interface 160 may operate similar to the Gx interface 130, in that the interface 160 may also provide for the transmission of the policies 150 from the PCRF 122 to the WLAN controller 110. In an embodiment, the messages transmitted over the interface 160 are formatted according to a protocol compatible with the WLAN controller 110 and/or the PCRF 122. For example, the messages transmitted over the interface 160 may be formatted according to the RADIUS protocol or the DIAMETER protocol. As should be appreciated, the messages forwarded through the interface 160 may be encoded in any format so long as the message is in a format that is compatible with the receiving end. In an embodiment, the interface 160 implemented as an API enables a communicative connection between the WLAN controller 110 and the PCRF 122, such that a tunnel or path does not need to be established between the WLAN controller 110 and the PCRF 122. The implementation of the interface 160 as an API may thus reduce the amount of resources required to interconnect the WLAN controller 110 with the PCRF 122.

In an embodiment, the WLAN controller 110 may receive and store policies 150 from the PCRF 122 for one or more UEs 102 accessing or attempting to access the WLAN 108. The WLAN controller 110 may execute a QoS application 153 to enforce the policies 150 on behalf of the UEs 102 to guarantee a minimum QoS for a subscriber and/or service accessing the WLAN 108. While the QoS application 153 is shown as part of the WLAN controller 110, in another embodiment, the QoS application 153 may be located separate from the WLAN controller 110. In this embodiment, another entity separate from the WLAN controller 110 may be responsible for QoS enforcement based on policies in the WLAN 108.

The WLAN controller 110 may also track user consumption 156 of the resources within the WLAN 108. For example, a usage application 159 executing at the WLAN controller 110 may monitor the amount of traffic on the WLAN 108 that is being carried on behalf of the subscriber UE 102 and/or the usage application 159 may monitor a time during which the subscriber UE 102 utilizes the resources in the WLAN 108 to track user consumption 156. The usage application 159 may transmit the user consumption 156 to the PCRF 122 via the interface 160 such that the PCRF 122 uses the policies 150 to determine a charge for the WLAN 108 usage. Alternatively, the usage application 159 may determine adjustments to the billing, tracking, and auditing for the subscriber based on the user consumption data 156, and then send details about the adjustments to the core network 105.

During operation of the system 100, a UE 102 currently accessing the core network 105 may enter a geographical area or site serviced by the WLAN 108 (also referred to herein as the "hotspot zone"). When the UE 102 is located in the hotspot zone, the UE 102 may access, for example, the Internet via the WLAN 108 instead of the core network 105. In certain situations, access to the WLAN 108 may be beneficial over access to the core network 105 because, for example, the UE 102 may transmit data at higher speeds. In such a case, system 100 may perform a handover in which the UE 102 is either disconnected from the core network 105 and then connected to the WLAN 108 or the UE 102 is connected to both the WLAN 108 and the core network 105.

In such a case, the wireless access point 111 of the WLAN 108 may receive identification information from the UE 102. For example, the UE 102 may send a probe request or an authentication frame with the identification information of the UE 102 in response to a beacon frame sent by the wireless access point 111. As should be appreciated, the initial message exchanged between the UE 102 and the wireless access point 111 may be a series of messages sent between the UE 102 and the wireless access point 111 to associate the UE 102 with the wireless access point 111. The identification information may include an identifier of the UE 102, which may be the IMSI or any other identifier of the UE 102. The identification information may also include information regarding a device type of the UE 102, the original equipment manufacturer (OEM) of the UE 102, and any other information describing the UE 102.

Subsequently, the wireless access point 111 may forward an access request comprising the identification information of the UE 102 to the WLAN controller 110. In an embodiment, the WLAN controller 110 may use the identification information of UE 102 to authenticate the UE 102 with the AAA 121 over the RADIUS based interface 163. For example, the WLAN controller 110 may perform EAP-AKA authentication of the UE 102 with the AAA 121 over the RADIUS based interface 163. The EAP-AKA authentication is further described in the Network Working Group (NWG) Request for Comments 4187 document entitled "Extensible Authentication Protocol Method for 3rd Generation Authentication and Key Agreement (EAP-AKA)," by J. Arkko and H. Haverinen, dated January 2006. As should be appreciated, the WLAN controller 110 and the AAA 121 may use authentication schemes other than EAP-AKA authentication to authenticate the UE 102.

Upon authenticating the UE 102, the WLAN controller 110 may request one or more policies 150 of the subscriber associated with the UE 102 from the PCRF 122. In an embodiment, the WLAN controller 110 may generate a request for the policies 150 associated with the UE 102 in a format that is compatible with the PCRF 122. The WLAN controller 110 may transmit the request for the policies 150 to the PCRF 122 over the interface 160.

The PCRF 122 may then retrieve subscriber information related to the UE 102 from the SPR 140 over the Sp interface 145. For example, the subscriber information may indicate a type of subscription of the UE 102 (e.g., whether the user is a premium subscriber paying a higher monthly fee expecting a higher QoS or a lower priority subscriber paying a lower monthly fee expecting a lower QoS). The subscriber information may also indicate a type of subscriber of the user behind the UE 102 (e.g., whether the user is a first responder or emergency personnel expecting a higher QoS).

The PCRF 122 may also retrieve QoS requirements for a service or application executed by the UE 102 from the AF 141 over the Rx interface 146. For example, the QoS requirements may be higher for a corporate virtual private network (VPN) service as opposed to a QoS requirement for a video streaming service.

The PCRF 122 may use the subscriber information related to the UE 102, received from the SPR 140, and the QoS requirements received from the AF 141, to determine one or more polices 150 for the UE 102. In an embodiment, the policies 150 may indicate a QoS subscribed for by subscriber operating the UE 102.

The policies 150 may include one or more QoS parameters for the UE 102 performing the service or executing the application and other data. The QoS parameters in the policies 150 may include, for example, a rule name, a service data identifier, a service data flow filter, precedence, charging parameters, a monitor key, and/or other parameters that are used to provide a QoS for a subscriber. In an embodiment, the QoS parameters may indicate the subscriber for QoS in the form of a QoS tag. A QoS tag may be based on the type of service to which a packet belongs and/or the type of subscriber using the service. For example, a QoS tag may include a priority tag, such as an allocation and retention priority tag, which is used to define the relative importance of a resource request. The QoS tag may also include an indicator tag, such as a quality class indicator (QCI) tag, that indicates a value defining a minimum QoS parameter that the packet of a certain service should retain. The value of the indicator tag may be preset to define a set of QoS parameters related to a service and/or subscriber. For example, the indicator tag may indicate whether the packet is subject to a guaranteed bit rate, a priority, an upper bound packet delay, and/or an upper bound percentage of packets that may be lost, etc. The policies 150 may be used to separate traffic into different service flows, in which each service flow meets a certain QoS requirement. The different service flows enable the differentiation of traffic based on different QoS requirements.

In an embodiment, the PCRF 122 may reformat the data in the policies 150 into a format that is compatible with the WLAN controller 110. For example, the PCRF 122 may use the IMSI of the UE 102 as a key attribute, and encode the IMSI of the UE 102 into a message that is compatible with the WLAN controller 110. The PCRF 122 may also encode other attributes, such as, for example, a device type and a device OEM, into the message that is encoded to be compatible with the WLAN controller 110. The PCRF 122 may then transmit the policies 150 to the WLAN controller 110 via the interface 160.

After the UE 102 is authenticated and the policies 150 for the UE 102 have been received, the WLAN controller 110 may execute the QoS application 153 to enforce the policies 150. The QoS application 153 may enforce the policies 150 for a subscriber by allocating resources for the UE 102 in the WLAN 108 based on the policies 150. The resources in the WLAN 108 may refer to networking, processing, or storage resources, such as, for example, bandwidth, memory, central processing unit (CPU) resources, etc.

In an embodiment, the QoS application 153 may determine a QoS tag for a UE 102 based on the policies 150 for the UE 102 and then attach a QoS tag to each packet sent on behalf of the UE 102 and forwarded through the WLAN 108. The QoS application 153 may identify packet flows that receive a common QoS treatment using the QoS tags described above. A packet flow may include packets of different services and different subscribers, but each of the packets within the packet flow may be subject to the same QoS treatment. The QoS application 153 may establish a path for each of the packet flows based on the QoS parameters indicated in the policies 150.

When the WLAN controller 110 is managing resources within the WLAN 108 for multiple UEs 102, the QoS application 153 may determine a relative priority between different subscribers of the UEs 102 and/or services executing at the UEs 102. The QoS application 153 may then allocate resources within the WLAN 108 based on the determined priority. For example, the QoS application 153 may manage resources in the WLAN 108 to ensure that traffic of higher priority subscribers is forwarded on high priority paths, even when available resource capacity is low, by either decreasing the quality of or dropping the packets of lower priority subscribers. The higher priority subscribers may be the subscribers that pay for premium subscription plans or may be the subscribers that are considered first responders or emergency personnel. In this way, the QoS application 153 differentiates the QoS between different users in the WLAN 108 based on the policies 150 determined according to a subscription with the carrier of the core network 105.

In an embodiment, the WLAN controller 110 executes the usage application 159 to monitor the UE 102 usage of the resources in the WLAN 108 to obtain the user consumption 156. The usage consumption 156 may be used to determine a charge for the subscriber or to adjust a pre-paid billing of the subscriber based on WLAN 108 usage. The WLAN controller 110 may transmit the usage consumption 156 to the PCRF 122 or any other component in the core network 105 for billing, tracking, and auditing purposes.

In this way, the WLAN controller 110 may enforce policies 150 in WLAN 108 for a subscriber that is pre-registered with the carrier, which enables subscribers to experience an expected QoS when using the WLAN 108 and the core network 105. In addition, the WLAN controller 110 may enforce the policies 150 by throttling traffic for subscribers based on a usage of the subscriber. The WLAN controller 110 may also enforce the policies 150 to ensure that certain personnel are always given the highest priority within the WLAN 108.

Figure 2:
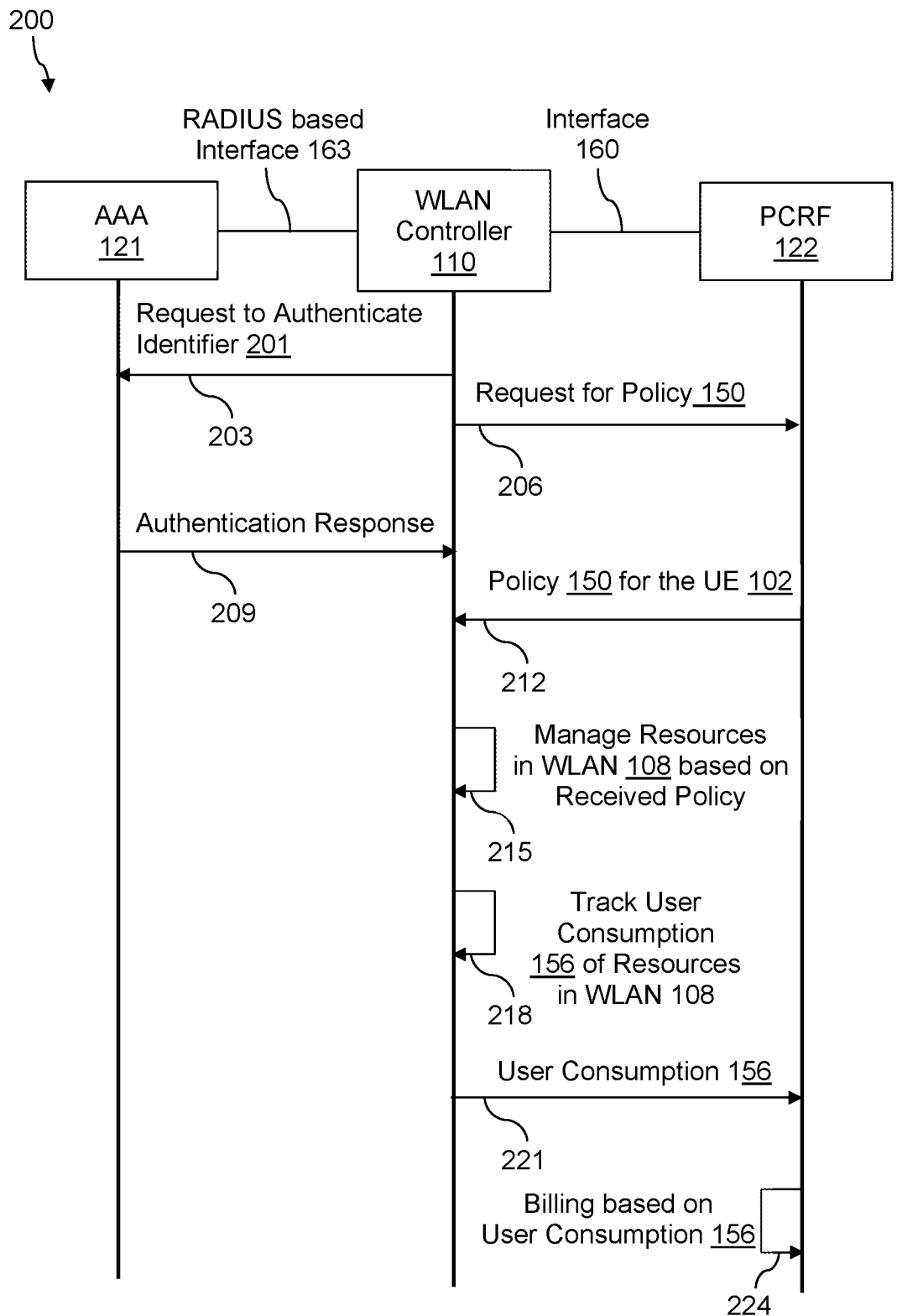
FIG. 2 is a message sequence diagram of a first method performed by the communication system of FIG. 1 according to an embodiment of the disclosure.

Referring now to FIG. 2, a message sequence diagram illustrating a method 200 is described. The method 200 is performed by the AAA 121, WLAN controller 110, and PCRF 122. As shown in FIG. 2, the AAA 121 and the WLAN controller 110 are communicatively coupled together via the RADIUS based interface 163. Similarly, the WLAN controller 110 and the PCRF 122 are communicatively coupled together via the interface 160.

In an embodiment, the method 200 is performed after the UE 102, currently accessing the core network 105, enters the hotspot zone of the WLAN 108. The method 200 may also be performed after the WLAN controller 110 receives an access request from the wireless access point 111, in which the access request includes identification information of the UE 102.

In the embodiment shown in FIG. 2, the WLAN controller 110 may then use the received access request to send two separate requests to the AAA 121 and the PCRF 122, respectively. At step 203, the WLAN controller 110 may transmit a request to authenticate the UE 102 to the AAA 121 via the RADIUS based interface 163. The request may include an identifier 201 of the UE 102, which may be, for example, IMSI information of the UE 102 that identifies the UE 102. At step 206, the WLAN controller 110 may transmit a request fora policy 150 of the UE 102 to the PCRF 122.

In this embodiment, the AAA 121 authenticates the UE 102 using the EAP-AKA authentication scheme or any other authentication scheme. In the embodiment shown in FIG. 2, at step 209, the AAA 121 may transmit an authentication response to the WLAN controller 110. For example, the authentication response may indicate whether the UE 102 is registered with, and thus a paid subscriber of, the carrier operating the core network 105. The authentication response may also indicate whether the UE 102 is authenticated with the core network 105.

In a second embodiment not shown in FIG. 2, the WLAN controller 110 transmits a single request to authenticate the UE 102 to the AAA 121 via the RADIUS based interface 163. In this embodiment, the AAA 121 may then send the PCRF 122 a request for a policy 150 of the UE 102 to be sent back to the WLAN controller 110 after authenticating the UE 102. The request for the policy 150 may also include the authentication response.

In either embodiment, when the UE 102 is registered with the carrier and authenticated with the core network 105, at step 212, the PCRF 122 determines the policy 150 for the UE 102 and transmits the policy 150 to the WLAN controller 110 via the interface 160. The policy 150 may indicate various QoS parameters subscribed for the subscriber of the UE 102. In the case in which the subscriber of the UE 102 has not paid for any particular QoS parameters, the policy 150 may be a default policy 150, indicating a minimum bit rate for a paying subscriber. The policy 150 may also indicate whether the user is permitted to access the WLAN 108. As described above, the QoS parameters may also include one or more QoS tags indicating the QoS parameters subscribed for the UE 102.

As an example, attributes that are transmitted from the PCRF 122 to the WLAN controller 110 over the interface 160 may be as follows:

GET/customer?include=IMSI HTTP/1.1
HTTP/1.1 200 OK
Content-Type: application/vnd.api+json
{
 "data": [{
 "type": "CurtomerProfile",
 "id": "1",
 "attributes": {
  "DeviceType": "JSON:API Telco Customer Untrust Interface Support",
  "DeviceOEM": "Get customer IMSI or other identifications",
  "DeviceIMSI": "12345678911234",
  "DeviceQoS": "05"
  }]
{

After receiving policies 150 from the PCRF 122, at step 215, the WLAN controller 110, or another component in the system 100, may begin managing the resources in the WLAN 108 to forward traffic on behalf of the UE 102 according to the policies 150. As mentioned above, the WLAN controller 110 may differentiate traffic for different combinations of users and/or services by adding one or more QoS tags to the data packets. In this case, the WLAN controller 110 and the network devices within the WLAN 108 (e.g., routers, switches, bridges, VPNs, etc.) are configured to forward the packets along a particular QoS specified path according to the QoS tags added to the data packets. As should be appreciated, other methods of QoS enforcement may also be used to enforce the policies 150 in the WLAN 108.

In some cases, the WLAN controller 110 may throttle traffic in the WLAN 108 and between the core network 105 and the WLAN 108 to account for higher priority packets sent on behalf of premium subscribers or emergency personnel. In this case, the WLAN controller 110 may allocate resources in the WLAN 108 according to the available bandwidth and the policies 150 associated with each of the UEs 102 connected to the WLAN 108.

For example, suppose the core network 105 is operating at a high volume, in which the core network 105 does not have sufficient bandwidth to forward traffic on behalf of a premium subscriber at the expected QoS. For example, a premium subscriber may expect the core network 105 to provide data at a minimum bitrate, but the core network 105 is not capable of providing such a bit rate to the subscriber. In this case, the WLAN controller 110 may determine that the bitrate can be provided to the subscriber via the WLAN 108 instead of the core network 105. The WLAN controller 110 may automatically establish a connection between a UE 102 of the premium subscriber and the WLAN 108. The WLAN controller 110 may then forward packets to and from the UE 102 at the expected bit rate.

In an embodiment, the WLAN controller 100 may, for example, disconnect devices of lower level subscribers accessing the WLAN 108 or adjust the bitrates of lower level subscribers accessing the WLAN 108. This may enable the WLAN 108 to provide the expected bitrate for the device of a premium subscriber. For example, the WLAN controller 110 may reduce the bitrate of a lower level subscriber to provide a higher bitrate for the premium subscriber. The WLAN controller 110 may even disconnect certain devices from the WLAN 108 when a premium subscriber requires access to the WLAN 108, to forward packets through the WLAN 108 on behalf of the premium subscriber. In this way, the WLAN controller 110 may throttle traffic in the WLAN 108 and between the core network 105 and the WLAN 108 to account for higher priority packets sent on behalf of premium subscribers or emergency personnel.

As another example, a UE 102 of an emergency worker, such as a first responder, may enter the hotspot zone of the WLAN 108 and may require connection to the Internet for responding to an emergency situation. In this case, the WLAN controller 110 may determine, during the authentication process, that the subscriber behind the UE 102 is a first responder based on pre-registered credentials with the core network 105. For example, the core network 105 may store information regarding devices belonging to the first responder and/or devices used by first responders to respond to emergency situations. The WLAN controller 110 may automatically connect the UE 102 to the WLAN 108 while reducing QoS or disconnecting the connection of other devices connected to the WLAN 108 that are not emergency personnel devices, thereby ensuring a higher QoS for the UE 102 of the first responder. In this way, the WLAN controller 110 may throttle traffic in the WLAN 108 and between the core network 105 and the WLAN 108 to account for higher priority packets sent on behalf of premium subscribers or emergency personnel.

At step 218, the WLAN controller 108 tracks the user consumption 156 of resources within the WLAN 108. For example, the WLAN controller 110 may monitor the amount of traffic transmitted on the WLAN 108 on behalf of the subscriber behind the UE 102 and/or the WLAN controller 110 may monitor a time during which the user utilizes the resources in the WLAN 108 to track user consumption 156.

In an embodiment, the user consumption 156 may refer to amount of data transmitted to and/or from the UE 102 using the resources in the WLAN 108 or a duration of time during which the UE 102 uses the resources in the WLAN 108. In an embodiment, the user consumption 156 may be a factor of a particular QoS provided to the UE 102 while transmitting data using the resources in the WLAN 108 or during the time of using the resources in the WLAN 108. For example, the user consumption 156 may be based on both a bitrate provided to the subscriber behind the UE 102 and amount of data that was transmitted at the bitrate. As another example, the user consumption 156 may be based on both the bitrate and an amount of time that the user was accessing the WLAN 108 at the bitrate.

At step 221, the WLAN controller 110 may transmit the user consumption 156 to the PCRF 122 via the interface 160. At step 224, the PCRF 122 may determine a billing (a new bill, charge, or adjustment to a previous bill) based on the user consumption 156 of the WLAN 108. In another embodiment, the WLAN controller 110 may transmit the user consumption 156 to any other entity in the core network 105 for billing, tracking, and auditing purposes.

In an embodiment, the PCRF 122 may determine a charge for the subscriber based on the user consumption 156 and/or a QoS provided to the UE 102 while transmitting data using the resources in the WLAN 108 or during the time of using the resources in the WLAN 108. For example, the PCRF 122 may use determine, based on the user consumption 156, that the UE 102 accessed a particular amount of bandwidth in the WLAN 108 to transmit an amount of data for a period of time. The PCRF 122 may determine a charge for the subscriber based on the amount of bandwidth used in the WLAN 108, the amount of time, and/or the period of time.

Figure 3:
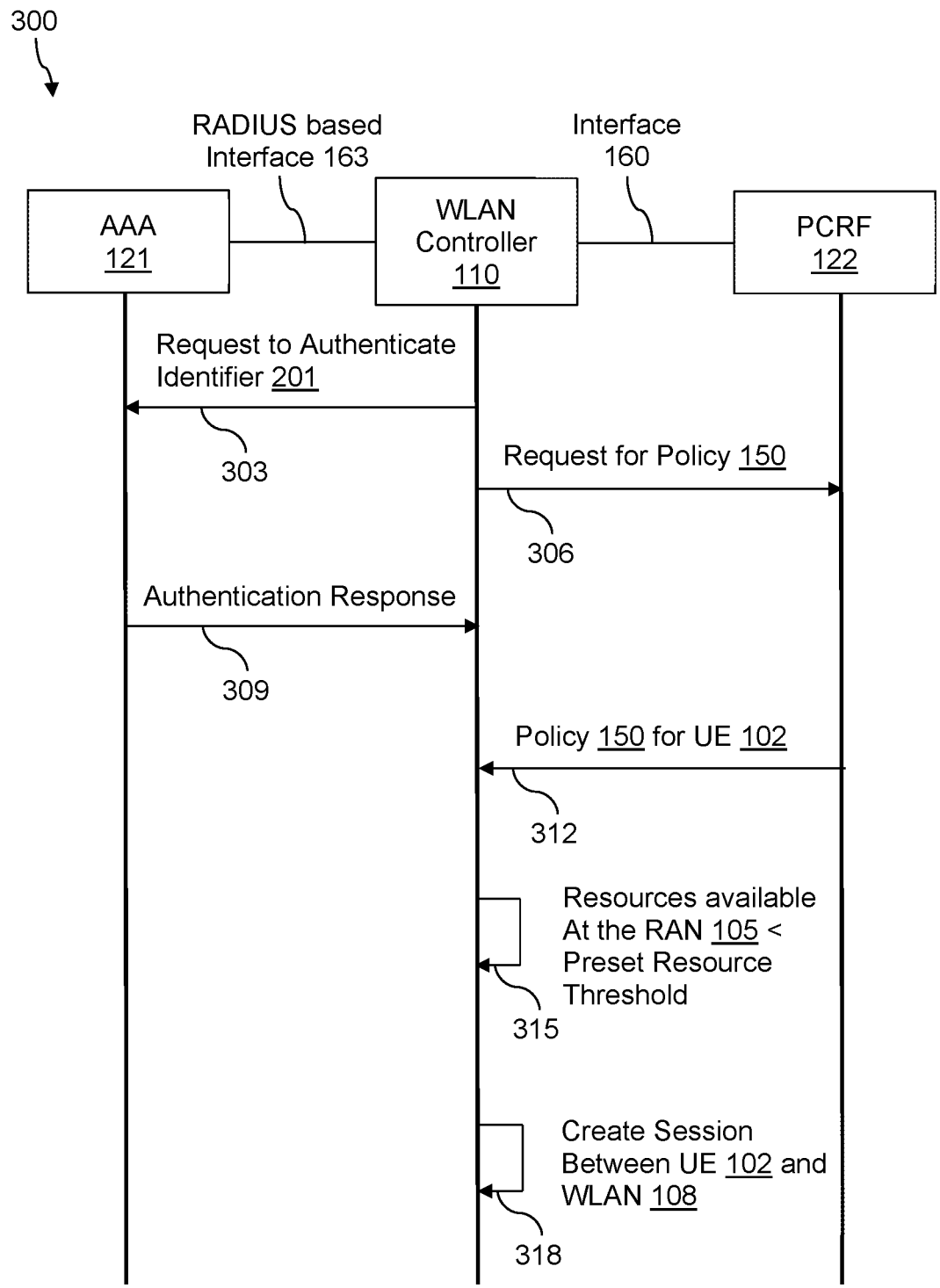
FIG. 3 is a message sequence diagram of a second method performed by the communication system of FIG. 1 according to an embodiment of the disclosure.

Referring now to FIG. 3, a message sequence diagram illustrating a method 300 is described. Similar to method 200 in FIG. 2, method 300 is performed by the AAA 121, WLAN controller 110, and PCRF 122. However, unlike method 200 in FIG. 2, method 300 describes an embodiment in which the WLAN controller 110 only connects the UE 102 to the WLAN 108 when the core network 105, for example, is unavailable or operating at a lower capacity.

As shown in FIG. 3, the AAA 121 and the WLAN controller 110 are communicatively coupled together via the RADIUS based interface 163. Similarly, the WLAN controller 110 and the PCRF 122 are communicatively coupled together via the interface 160.

In an embodiment, the method 300 is performed after the UE 102, currently accessing the core network 105, enters the hotspot zone of the WLAN 108. The method 300 may also be performed after the WLAN controller 110 receives an access request from the wireless access point 111, in which the access request include identification information of the UE 102.

In the embodiment shown in FIG. 3, the WLAN controller 110 may then use the received access request to send two separate requests to the AAA 121 and the PCRF 122, respectively. At step 303, the WLAN controller 110 may transmit a request to authenticate the UE 102 to the AAA 121 via the RADIUS based interface 163. The request may include an identifier 201 of the UE 102, which may be, for example, IMSI information of the UE 102 that identifies the UE 102. At step 306, the WLAN controller 110 may transmit a request for a policy 150 of the UE 102 to the PCRF 122.

As described above, the AAA 121 and the WLAN controller 110 may authenticate the UE 102 using the EAP-AKA authentication scheme or any other authentication scheme. At step 309, the AAA 121 may transmit an authentication response to the WLAN controller 110. For example, the authentication response may indicate whether the UE 102 is registered with, and thus a paid subscriber of, the carrier operating the core network 105. The authentication response may also indicate whether the UE 102 is authenticated with the core network 105.

In a second embodiment not shown in FIG. 3, the WLAN controller 110 transmits a single request to authenticate the UE 102 to the AAA 121 via the RADIUS based interface 163. In this embodiment, the AAA 121 may then send the PCRF 122 a request for a policy 150 of the UE 102 to be sent back to the WLAN controller 110 after authenticating the UE 102.

In either embodiment, when the UE 102 is registered with the carrier and authenticated with the core network 105, at step 312, the PCRF 122 transmits the policy 150 for the UE 102 to the WLAN controller 110 via the interface 160. The policy 150 may indicate various QoS parameters subscribed for the UE 102, as described above with reference to FIG. 2.

In an embodiment, the policy 150 may indicate that the UE 102 may only connect to the WLAN 108 when the resources available at the core network 105 are less than a preset resource threshold. For example, the policy 150 may indicate that the UE 102 may only connect to the WLAN 108 to use the resources of the WLAN 108 when the bandwidth available in the core network 105 is less than a preset bandwidth threshold. Such a policy 150 may be specific to a UE 102 or generic to all UEs 102 attempting to establish a session within the WLAN 108.

At step 315, the WLAN controller 110 may receive the policy 150 described above and then determine whether the resources available in the core network 105 are less than a preset resource threshold. If not, then the WLAN controller 110 may ignore the request from the UE 102 to access the WLAN 108 such that the UE 102 remains connected to the core network 105.

When the resources available in the core network 105 are indeed less than a preset resource threshold, at step 318, the WLAN controller 110 may then create a session between the UE 102 and the WLAN 108. In one embodiment, the WLAN controller 110 may disconnect a session between the UE 102 and the core network 105 when establishing the session between the UE 102 and the WLAN 108. In another embodiment, the WLAN controller 110 may establish the session between the UE 102 and the WLAN 108 such that the UE 102 is connected to both the WLAN 108 and the core network 105.

In an embodiment in which the WLAN controller 110, the WLAN 108, and the core network 105 are all owned and operated by the carrier, the UE 102 may be automatically connected to the WLAN 108 without the user having to input WLAN 108 credentials (e.g., SSID and password) via the UE 102. Since the WLAN controller 110 authenticated the UE 102 with the AAA 121 of the core network 105 when the UE 102 enters the hotspot zone, then the UE 102 is automatically authenticated with the WLAN 108 as well. In this way, the handover of the UE 102 between the core network 105 and the WLAN 108 is seamless and transparent from the standpoint of the user.

In an embodiment in which the UE 102 is a mobile device changing locations from a location serviced by the core network 105 to a location within the hotspot zone serviced by the WLAN 108, the methods 200 and 300 may apply to automatically and seamlessly connect the UE 102 to the WLAN 108 and/or core network 105. In addition, the UE 102 may automatically begin to access the WLAN 108 at a particular QoS subscribed for with the carrier, without any involvement or interaction of the subscriber. In addition, the WLAN controller 110 may communicate with the core network 105 to offload subscriber traffic between the core network 105 and the WLAN 108, again, seamlessly, without any involvement or interaction with the subscriber. Thus, the embodiments herein create a transparent and seamless transition between wireless networks from the perspective of the subscriber, greatly enhancing a subscriber experience with a carrier and a third party WiFi provider, while more efficiently utilizing the resources within the wireless networks.

Figure 4:
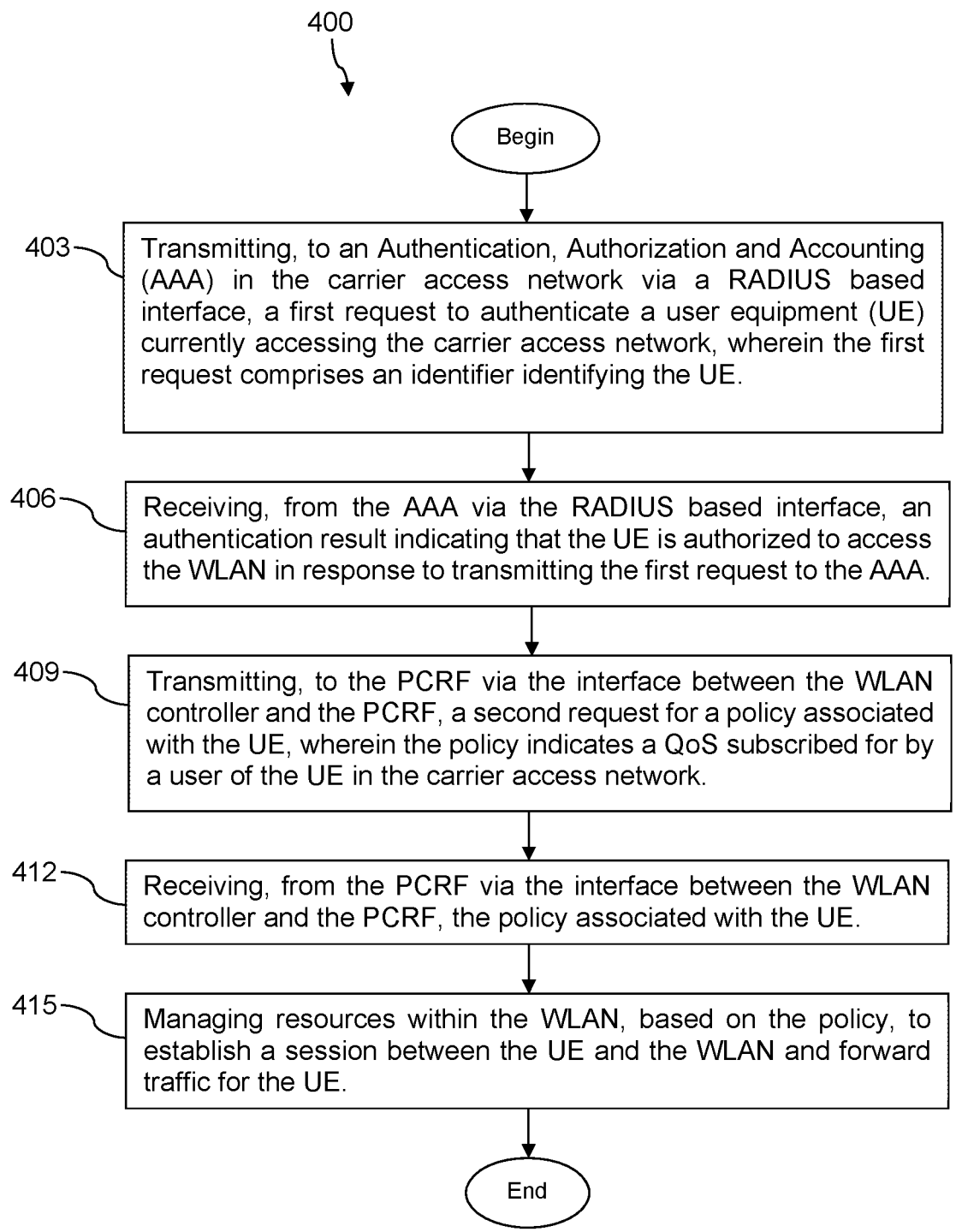
FIG. 4 is a flow chart of a method performed by a wireless local area network (WLAN) controller in the communication system of FIG. 1 according to an embodiment of the disclosure.

Turning now to FIG. 4, a method 400 is described. In an embodiment, the method 400 is a method of using an interface 160 between a WLAN 108 and a PCRF 122 in core network 105 to provide a QoS treatment for a UE 102. The method 400 may be performed by the WLAN controller 110 after the UE 102 enters the hotspot zone and after the WLAN controller 110 receives an access request from the wireless access point 111.

At block 403, the method 400 comprises transmitting, to an AAA 121 via a RADIUS based interface 163, a first request to authenticate the UE that is currently accessing the core network 105. In an embodiment, the first request comprises an identifier 201 of the UE 102.

At block 406, the method 400 comprises receiving, from the AAA 121 via the RADIUS based interface 163, an authentication result indicating that the UE 102 is authorized to access the WLAN 108 in response to transmitting the first request to the AAA 121. In other cases, the authentication result may indicate that the UE 102 is not authorized to access the WLAN 108, in which case method 400 would end.

At block 409, method 400 comprises transmitting, to the PCRF 122 via the interface 160, a second request for a policy 150 associated with the UE 102. In an embodiment, the policy 150 indicates a QoS subscribed for by the user of the UE 102 in the core network 105. For example, the user may have prepaid for a certain subscription package with the carrier, in which the subscription package may indicate a minimum QoS, such as a minimum bitrate, that may be dedicated for traffic of the user.

At block 412, the method 400 comprises receiving, from the PCRF 122 via the interface 160, the policy 150 associated with the UE 102. As described above, the policy 150 associated with the UE 102 may include one or more QoS tags. At block 415, the method 400 comprises managing resources within the WLAN 108 based on the policy 150 to establish a session between the UE 102 and the WLAN 108 to forward traffic for the UE 102. In an embodiment, the method 400 may further comprise only establishing the session between the UE 102 and the WLAN 108 based on the available resources within the core network 105.

Figure 5:
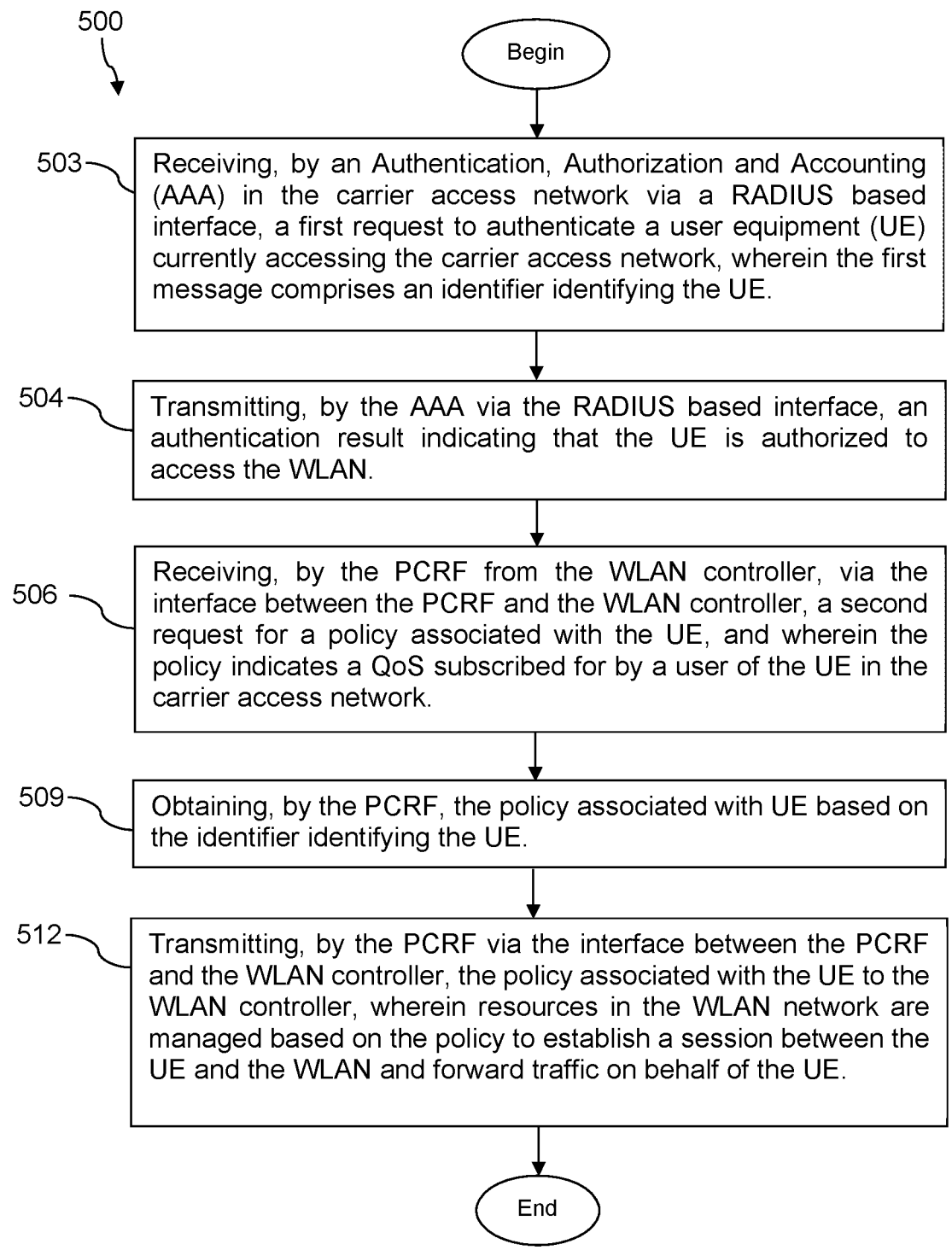
FIG. 5 is a flow chart of a method performed by a PCRF in the communication system of FIG. 1 according to an embodiment of the disclosure.

Turning now to FIG. 5, a method 500 is described. In an embodiment, the method 500 is a method of using an interface 160 between a WLAN 108 and a PCRF 122 in a core network 105 to provide a QoS treatment for a UE 102. The method 500 may be performed by the AAA 121 and the PCRF 122 after the UE 102 enters the hotspot zone and after the WLAN controller 110 receives an access request message from the wireless access point 111.

At block 503, the method 500 comprises receiving, by an AAA 121 via a RADIUS based interface 163, a first request to authenticate the UE that is currently accessing the core network 105. In an embodiment, the first request comprises an identifier 201 of the UE 102.

At block 504, the method 500 comprises transmitting, by the AAA 121 via the RADIUS based interface 163, an authentication result indicating that the UE 102 is authorized to access the WLAN 108 in response to receiving the first request. In other cases, the authentication result may indicate that the UE 102 is not authorized to access the WLAN 108, in which case method 400 would end.

At block 506, method 500 comprises receiving, by the PCRF 122 via the interface 160, a second request for a policy 150 associated with the UE 102. In an embodiment, the policy 102 indicates a QoS subscribed for by the user of the UE 102 in the core network 105. For example, the user may have prepaid for a certain subscription package with the carrier, in which the subscription package may indicate a minimum QoS, such as a minimum bitrate, that may be dedicated for traffic of the user.

At block 509, the method 500 comprises obtaining, by the PCRF 122, the policy 150 associated with the UE 102 based on the identifier 201 identifying the UE. At block 512, the method 500 comprises transmitting, by the PCRF 122 to the WLAN controller 110, via the interface 160, the policy 150 associated with the UE 102. In an embodiment, the resources in the WLAN 108 are managed based on the policy 150 to establish a session between the UE 102 and the WLAN 108 and forward traffic on behalf of the UE 102.

Figure 6A:
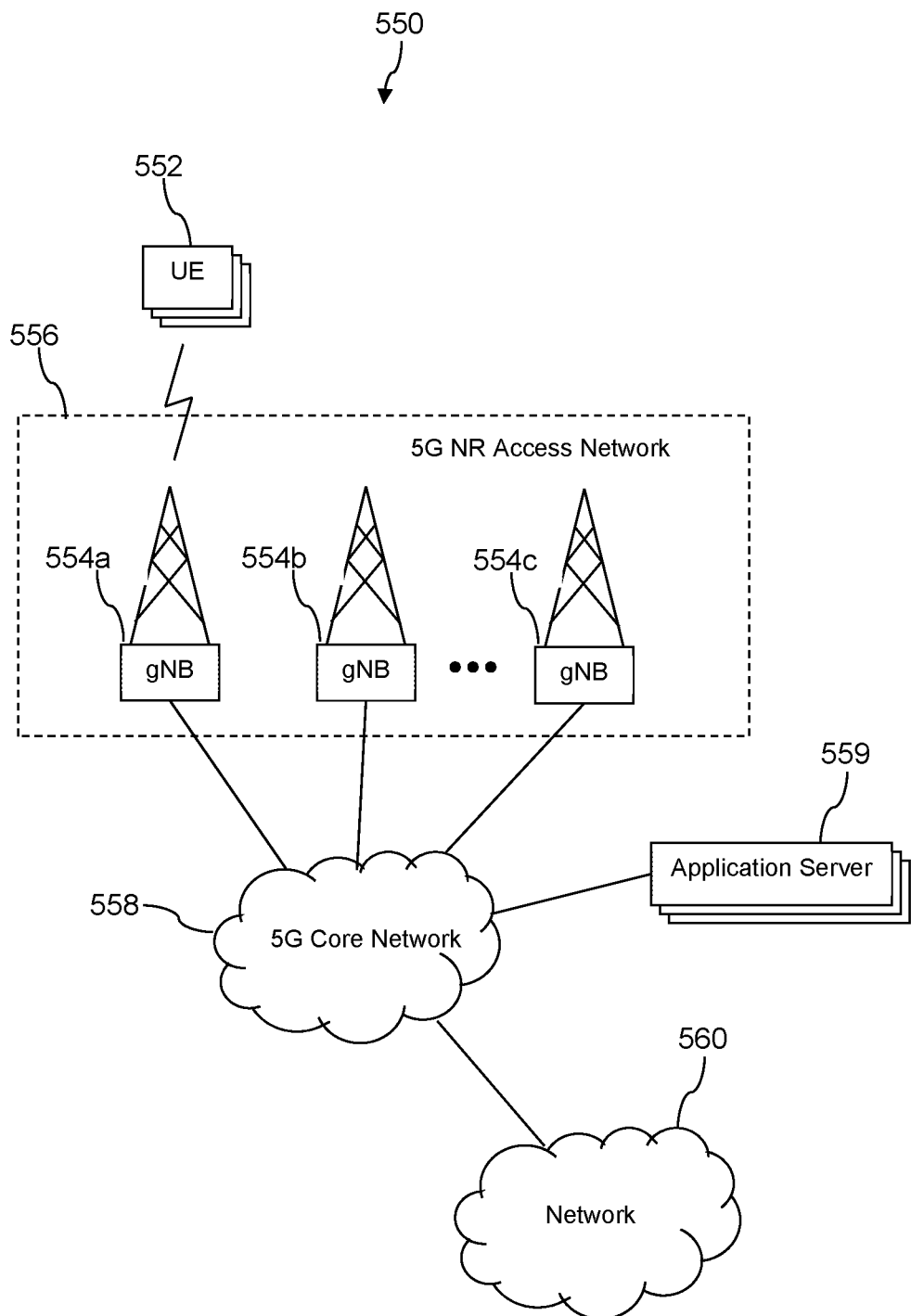
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
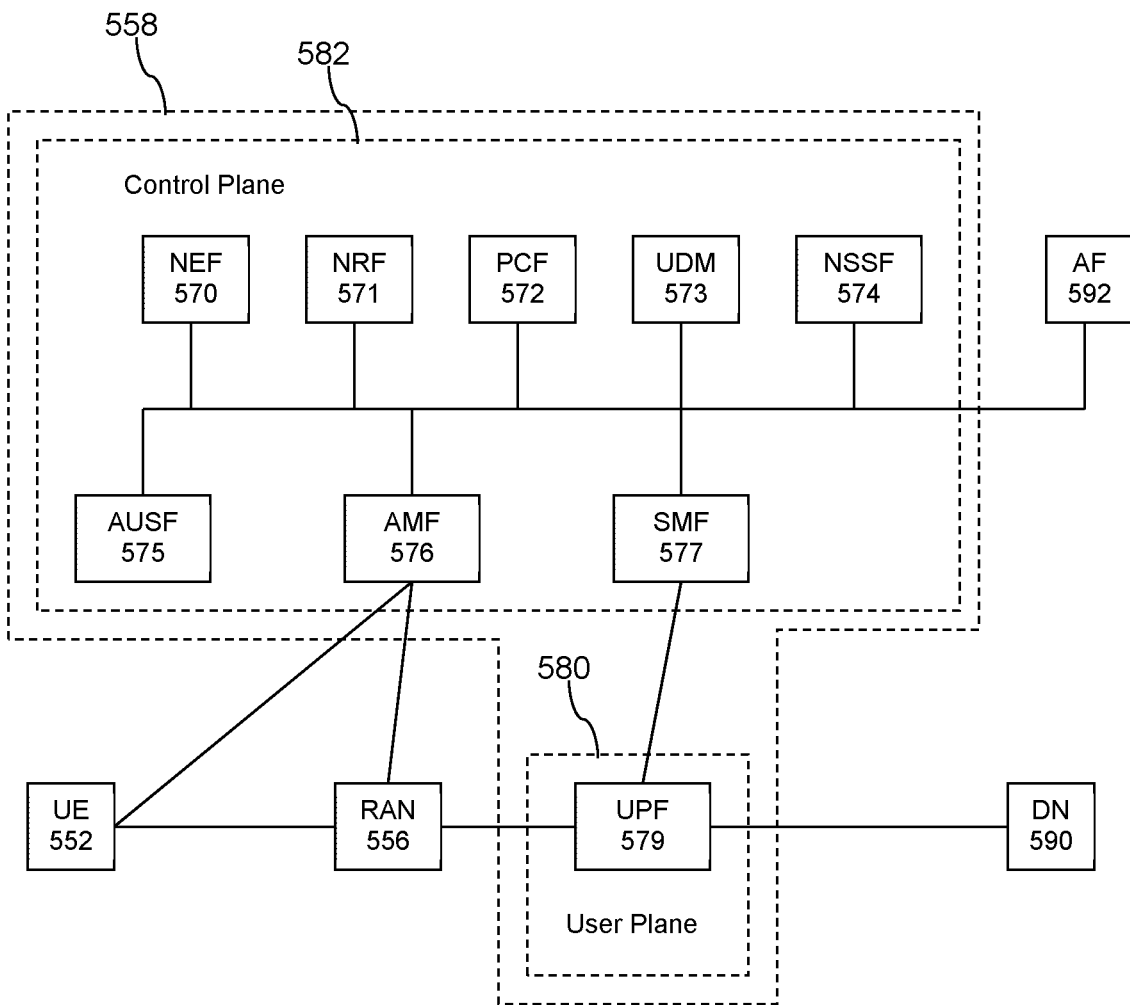

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
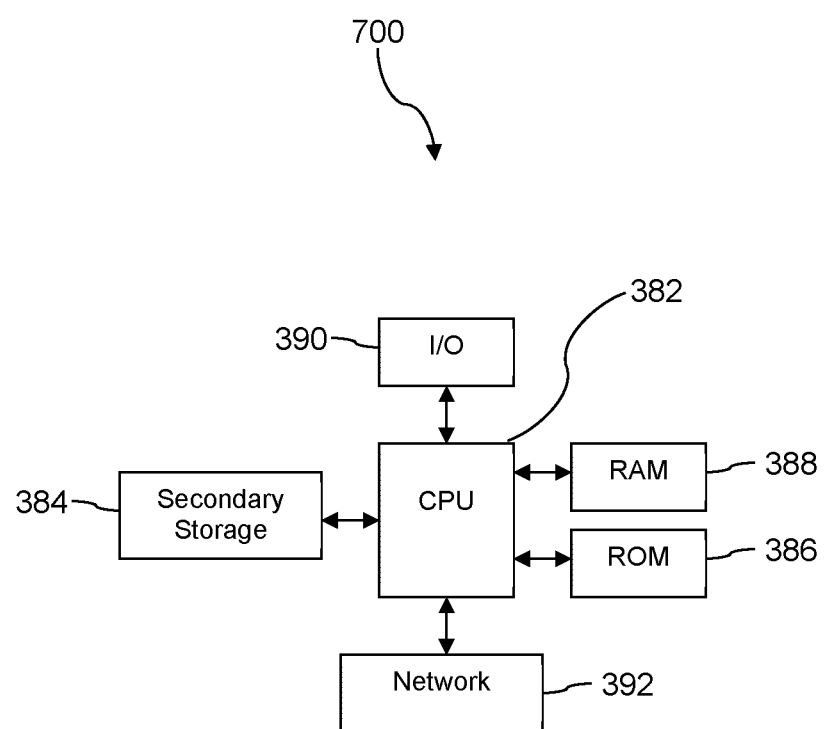
FIG. 7 is a block diagram of a computer system implemented within the communication system of FIG. 1 or FIGS. 6A-B according to an embodiment of the disclosure.

FIG. 7 illustrates a computer system 700 suitable for implementing one or more embodiments disclosed herein. In an embodiment, the WLAN controller 110 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a wireless local area network (WLAN) controller for using an interface between the WLAN controller and a Policy Charging and Rules Function (PCRF) in a core network to provide quality of service (QoS) treatment for a user equipment (UE):
   transmitting, by the WLAN controller to an Authentication, Authorization and Accounting (AAA) in the core network via a RADIUS based interface, a first request to authenticate the UE currently accessing the core network, wherein the first request comprises an identifier identifying the UE;
   receiving, by the WLAN controller from the AAA via the RADIUS based interface, an authentication result indicating that the UE is authorized to access the WLAN in response to transmitting the first request to the AAA;
   transmitting, by the WLAN controller to the PCRF via the interface between the WLAN controller and the PCRF, a second request for a policy associated with the UE, wherein the policy indicates a QoS subscribed for by a user of the UE in the core network;
   receiving, by the WLAN controller from the PCRF via the interface between the WLAN controller and the PCRF, the policy associated with the UE; and
   managing, by the WLAN controller, resources within the WLAN, based on the policy, to establish a session between the UE and the WLAN.

2. The method of claim 1, wherein the interface between the WLAN controller and the PCRF is an application programming interface (API) configured to communicatively couple the WLAN controller and the PCRF.

3. The method of claim 1, further comprising:
   tracking, by the WLAN controller, user consumption of the resources within the WLAN or a time duration during which the user accessed the resources within the WLAN; and
   transmitting, by the WLAN controller, information regarding the user consumption of the resources within the WLAN or the time duration during which the user accessed the resources within the WLAN to an element in the core network for billing purposes.

4. The method of claim 1, wherein the policy is based on an application and subscription information of a plurality of users registered with a carrier operating the core network.

5. The method of claim 4, wherein the subscription information of the user of the UE comprises at least one of allowed services, allowed QoS, charging related information, or a category.

6. The method of claim 1, wherein the policy indicates that the UE is permitted to establish a session with the WLAN, wherein the policy indicates that the user is subscribed for an allowed QoS, and wherein the method further comprises creating, by the WLAN controller, the session between the UE and the WLAN based on the allowed QoS.

7. The method of claim 1, wherein the policy indicates that the UE is permitted to establish a session with the WLAN when the core network reaches a preset resource threshold, and wherein the method further comprises creating, by the WLAN controller, the session between the UE and WLAN only when the core network reaches the preset resource threshold.

8. A wireless local area network (WLAN) controller for providing a quality of service (QoS) treatment for a user equipment (UE) in a WLAN, the WLAN controller comprising:
- a non-transitory memory configured to store instructions; and
- a processor coupled to memory and configured to execute the instructions, which cause the processor to be configured to:
  - transmit, to an Authentication, Authorization and Accounting (AAA) in a core network via a RADIUS based interface, a first request to authenticate the UE currently accessing the core network, wherein the first request comprises an identifier identifying the UE;
  - receive, from the AAA via the RADIUS based interface, an authentication result indicating that the UE is authorized to access the WLAN in response to transmitting the first request to the AAA;
  - transmit, to a Policy Charging and Rules Function (PCRF) in the core network via an interface between the WLAN controller and the PCRF, a second request for a policy associated with the UE, wherein the policy indicates a QoS subscribed for by a user of the UE in the core network;
  - receive, from the PCRF via the interface between the WLAN controller and the PCRF, the policy associated with the UE; and
  - manage resources within the WLAN, based on the policy, to establish a session between the UE and the WLAN.

9. The WLAN controller of claim 8, wherein the interface between the WLAN controller and the PCRF is an application programming interface (API) configured to communicatively couple the WLAN controller and the PCRF.

10. The WLAN controller of claim 8, wherein the instructions further cause the processor to be configured to:
- track user consumption of the resources within the WLAN or a time duration during which the user accessed the resources within the WLAN; and
- transmit information regarding the user consumption of the resources within the WLAN or the time duration during which the user accessed the resources within the WLAN to an element in the core network for billing purposes.

11. The WLAN controller of claim 8, wherein the policy is based on an application and subscription information of a plurality of users registered with a carrier operating the core network.

12. The WLAN controller of claim 11, wherein the subscription information of the user of the UE comprises at least one of allowed services, allowed QoS, charging related information, or a category.

13. The WLAN controller of claim 8, wherein the policy indicates that the UE is permitted to establish a session with the WLAN, wherein the policy indicates that the user is subscribed for an allowed QoS, and wherein the instructions further cause the processor to be configured to create the session between the UE and the WLAN based on the allowed QoS.

14. The WLAN controller of claim 8, wherein the policy indicates that the UE is permitted to establish a session with the WLAN when the core network reaches a preset resource threshold, and wherein the instructions further cause the processor to be configured to create the session between the UE and WLAN only when the core network reaches the preset resource threshold.

15. A wireless communications system, comprising:
- a wireless local area network (WLAN);
- a WLAN controller coupled to the WLAN;
- a core network, comprising:
  - an Authentication, Authorization and Accounting (AAA); and
  - a Policy Charging and Rules Function (PCRF);
- a RADIUS based interface; and
- an interface between the WLAN controller and the PCRF,
- wherein the WLAN controller is configured to transmit, via the RADIUS based interface, to the AAA, a request to authenticate a user equipment (UE) currently accessing the core network, wherein the first message comprises an identifier identifying the UE,
- wherein the PCRF is configured to transmit, via the interface between the WLAN controller and the PCRF, a policy associated with the UE, wherein the policy indicates a quality of service (QoS) subscribed for by a user of the UE in the core network, and
- wherein the WLAN controller is configured to manage resources within the WLAN, based on the policy, to establish a session between the UE and the WLAN.

16. The wireless communications system of claim 15, wherein the interface between the WLAN controller and the PCRF is an application programming interface (API) configured to communicatively couple the WLAN controller and the PCRF.

17. The wireless communications system of claim 15, wherein the WLAN controller is configured to:
- track user consumption of the resources within the WLAN or a time duration during which the user accessed the resources within the WLAN;
- determine charge information for the user based on the consumption of the resources and the policy; and
- transmit information regarding the consumption of the resources within the WLAN or the time duration during which the user accessed the resources within the WLAN to an element in the core network for billing purposes.

18. The wireless communications system of claim 15, wherein the policy is based on an application and subscription information of a plurality of users registered with a carrier operating the core network.

19. The wireless communications system of claim 18, wherein the subscription information of the user of the UE comprises at least one of allowed services, allowed QoS, charging related information, or a category.

20. The wireless communications system of claim 15, wherein the policy indicates that the UE is permitted to establish a session with the WLAN, wherein the policy indicates that the user is subscribed for a QoS, and wherein the WLAN controller is further configured to establish the session between the UE and the WLAN based on the QoS.

* * * * *